3,379,564
METHOD OF COATING A SYNTHETIC POLYMERIC MATERIAL BY CROSS-LINKING A POLYSILOXANE CONTAINING 2 - CYANOETHYL AND 2-CARBOXYETHYL GROUPS
Eckhard C. A. Schwarz, Grifton, N.C., assignor to E. I. du Pont de Nemours and Company, Wilmington, Del., a corporation of Delaware
No Drawing. Filed Jan. 7, 1965, Ser. No. 424,125
6 Claims. (Cl. 117—138.8)

This invention relates to a textile-treating composition and, more specifically, to a textile treatment to provide antistatic properties.

As is well known to the art, the synthetic, textile fibers such as polyethylene terephthalate, hexamethylene adipamide, and acrylonitrile, as well as others of the polyester, polyamide, and polyacrylic types, are hydrophobic in character which makes them susceptible to the development and retention of static electrical charges. Although many antistatic treating agents for such fibers have been disclosed in the art, the search for even better agents continues. For example greater effectiveness and permanence of effect are desired, especially for textiles that are subjected to sulfonate-type detergents and hard water.

It is an object of this invention to provide textile fibers and fabrics having permanent antistatic surface characteristics.

It is a further object of this invention to provide an improved process for cross-linking polymeric chains.

These and other objects are accomplished by an improved process for providing synthetic polymeric substrates with a coating comprising 1 to 5 percent by weight, based on the weight of the surface to be coated, of a composition containing a polysiloxane in which at least about 90 percent of the silicon atoms carry 2-cyanoethyl groups and at least about 1 percent of the silicon atoms carry 2-carboxyethyl groups and between about 2 and 20 percent by weight, based on the weight of the polysiloxane, of an organic peroxide decomposing above 100° C., but below the melting or decomposition temperature of the polymer being treated, and heating to cross-link the polysiloxane. It has been discovered that a coating of a polymeric material which contains both the $$-CH_2-CH_2-CN$$

group and the

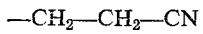

group as a part of the polymer molecules will impart permanent antistatic properties to hydrophobic fibers and other polymeric substrates and can be readily cross-linked to impart durability to the coating. Of the many such polymers which may be prepared, the polysiloxanes are preferred because they are commercially available and because their use does not result in fabric stiffening.

Polysiloxanes which contain the

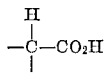

unit, wherein R is a hydrocarbon group containing 1–6 carbon atoms, and is preferably a methyl group, are referred to herein as 2-cyanoethyl polysiloxanes. The antistatic protection conferred by the 2-cyanoethyl polysiloxanes is directly proportional to the number of siloxy units carrying 2-cyanoethyl groups. Consequently, polysiloxanes in which at least about 90 percent of the silicon atoms are bonded to a 2-cyanoethyl group are preferred.

Such polysiloxanes may, of course, be modified by the introduction of other siloxy groups, e.g., dimethyl-siloxy groups, and while modification dilutes the antistatic activity, suitable antistatic protection is generally retained provided about 50 percent of the silicon atoms are bonded to a 2-cyanoethyl group. However, the modified 2-cyanoethyl polysiloxane will need to be applied in greater amounts corresponding to the degree of modification in order to confer equivalent antistatic protection.

As previously indicated, the polysiloxane must also contain the

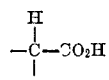

group. The presence of the

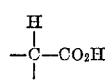

group, as will be more fully discussed hereinafter, is an essential part of my invention. While the 2-cyanoethyl polysiloxanes provide the desired antistatic properties, they are deficient in durability, particularly to dry cleaning. The presence of the

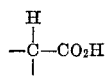

group permits the polysiloxane chains to be readily cross-linked to provide a coating with greatly enhanced durability. Preferably, the

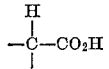

group is present in the polysiloxane as an element of the

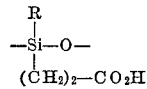

unit, wherein R has the same significance as above.

In compliance with the above, the polysiloxanes useful in the practice of this invention will have, in one specific form, the following structure:

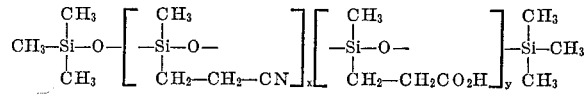

wherein the ratio of $x:y$ varies between 9:1 and 99:1. When the percent of silicon atoms carrying the $-CH_2-CH_2-CO_2H$ group falls below about 1 percent, the durability of the coating becomes unacceptable. When the percent of silicon atoms carrying the $$-CH_2-CH_2-CO_2H$$

group exceeds about 10 percent, the decrease in static activity of the polysiloxane is noticeable; moreover, any unreacted carboxyl groups will aid in the solubilization or emulsification of the polysiloxane and thus facilitate its removal during subsequent cleaning operations. For optimum results, the percent of the silicon atoms carrying the $-CH_2-CH_2-CO_2H$ group is between 2 and 5 percent.

In accordance with this invention, polysiloxanes containing the

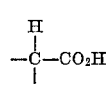

group can be readily and effectively cross-linked by heating in the presence of an organic peroxide. While this invention is not to be limited by theoretical considerations, it is believed that cross-linking occurs by the abstraction of the hydrogen atom from the alpha carbon atom by an organic radical formed by decomposition of the organic peroxide followed by migration of the carboxyl hydrocarbon atom to the alpha carbon atom, decarboxylation and the generation of an alkylene radical. The reaction of two alkylene radicals will result in the coupling of two polymer chains and the repetition of this series of reactions at random points along the polymer chains will then give rise to a cross-linked structure. The above series of reactions may be represented by the following generalized equations:

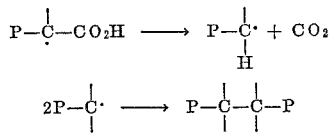

to form the generalized cross-linked structure:

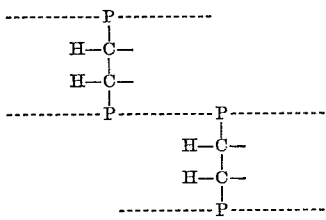

wherein P represents a segment of a polymer molecule and R· represents a radical formed by the decomposition of an organic peroxide. As is known to those skilled in the art, other reactions involving free radicals occur simultaneously with the above reactions. However, with respect to this invention, they are significant only in that they may compete with the reactions leading to cross-linking and thus render the cross-linking less than 100 percent effective. It has been observed that neither the corresponding esters and carboxylate salts nor carboxyl-containing polymers which do not contain a hydrogen atom on the alpha carbon leads to cross-linked structures. Although the final cross-linked structure is very similar to that obtained in the known preparation of silicone rubbers, where methyl side chains are cross-linked by benzoyl peroxide, the carboxyl-peroxide cross-linking method offers distinct advantages in that it proceeds at a much faster rate and is relatively insensitive to the presence of air, and thus permits the coating to be cross-linked on, for example, a fabric surface during a conventional heat-setting operation (160–190° C./1.5 minutes).

The organic peroxides most suitable for the practice of the invention are those with decomposition half-lives between 100 to 180° C. A decomposition temperature in excess of 100° C. is desired because the polysiloxanes are most conveniently applied from aqueous emulsions and any decomposition of the organic peroxide during the necessary drying step decreases the effectiveness of the cross-linking treatment. Suitable peroxides are, for example, benzoyl peroxide, tert-butyl perbenzoate, 2,5-dimethyl-2,5-di(tert-butylperoxy)hexane, 2,5 - dimethyl-2,5-di(tert-butylperoxy)hexyne.

From theory, it will be apparent that each equivalent of carboxylic acid in the polysiloxane will require a half mol of organic peroxide. Because of the competing reactions previously referred to, e.g., the coupling of two phenyl radicals, it is normally desirable to use an excess of the organic peroxide in order to achieve the optimum degree of cross-linking. As will be apparent to those skilled in the art, the amount of peroxide used may be varied with the carboxylic acid content of the polysiloxane and the degree of cross-linking desired. The usual practice is to seek the maximum degree of cross-linking attainable and it has been found that this can be achieved with a peroxide excess of about 100 percent.

In general, the fibers (or fabrics) should contain 0.77 percent by weight, based on the weight of the fibers, of the polysiloxane in order to achieve satisfactory protection from static. At loadings in excess of about 2.5 percent, no further increase in static protection is realized. Since the cross-linking reaction is not 100 percent effective, some loss of the coating occurs upon repeated cleaning operations. Accordingly, the initial loading should be between about 1 to 3 percent by weight, based on the weight of the fibers. Such loadings will provide static protection, as measured by log R values, of between about 12.5 and 13.8. Log R values in excess of 13.8 are not considered to be representative of adequate protection from static.

The polysiloxane may be applied to the fibers or other substrate by any suitable manner known to the art, e.g., by spraying or dipping methods utilizing solutions or emulsions of the polysiloxane. The concentration of the solution or emulsion may range from 1 percent to as high as 30 percent and more. For convenience, it is preferred to use a dipping process utilizing aqueous emulsions containing 1 to 3 percent of the polysiloxane.

After the fibers or other substrate have been treated with the polysiloxane and the water, or solvent, removed, the coated fibers are heated to cross-link the polysiloxane. The durability of the coating, as determined by the amount of the original coating retained on the fibers after repeated solvent extraction, will vary somewhat depending on the organic peroxide used, the heating temperature and the length of the heating period. In general, the coated fibers will be heated about 20 to 50° C. above the decomposition temperature of the organic peroxide from 2 to 10 minutes, with the shorter heating periods corresponding to the higher temperatures. Heating of the coated fibers under these conditions will result in about 70 to 90 percent and more of the weight of the original material being retained on the fibers as a durable coating.

In the examples which follow, the log R values are determined by measuring the surface resistance of the treated fabric swatches. These measurements are made under controlled conditions of 24 percent relative humidity and a temperature of 25° C. Current flowing across the fabric is measured with a Beckman model V Microammeter, and the surface resistance is calculated from this measurement and the known applied voltage. The log R value is the common logarithm of the resistance.

The fabric swatches are dry cleaned by tumbling, at room temperature, in a 3 percent solution of a mahogany oil dry-cleaning soap in perchloroethylene for 15 minutes followed by tumbling for 5 minutes in fresh perchloroethylene. This procedure constitutes one dry-cleaning cycle.

A washing cycle consists of one 35-minute cycle in an automatic home washing machine using 30 grams of a commercial detergent ("Tide") per 10 gallons (69 liters) of water at a temperature of 40° C., followed by 30 minutes tumbling in a home dryer.

Example I

A solution of a trimethylsiloxy end-capped methyl 2-cyanoethyl/methyl 2-carboxyethyl (95/5) copolysiloxane having a viscosity of 800 to 1300 centipoises, at 25° C., and benzoyl peroxide is prepared by dissolving 3.0 grams of the copolysiloxane and 0.5 gram of benzoyl peroxide in 6.4 grams of 3-pentanone. The solution is slowly added, with rapid stirring, to 150 grams of water containing 0.5 gram of an emulsifier prepared by condensing 1 mol of octylphenol with about 10 mols of ethylene oxide and 1 milliliter of concentrated hydrochloric acid. The resulting emulsion contains about 2.2 percent solids. Weighed swatches of polyethylene terephthalate taffeta fabric measuring 3 x 7 inches are dipped into the emulsion and allowed to dry at room temperature. The fabric is then heated in an oven at 175° C. for 3 minutes to cross-link the copolysiloxane. The fabric is weighed again so that the percent loading, based on the weight of the treated fabric, may be determined. The treated fabric is identified as sample A. The initial log R value for sample A is then determined as previously described. After the log R determination, sample A is subjected to 5 cycles of the dry-cleaning procedure previously described, weighed to determine the amount of coating retained, and the log R value again determined.

A second sample, sample B, is prepared in the same manner as that described for sample A. After determining the initial log R value, sample B is subjected to 5 cycles of the washing procedure previously described, weighed to determine the amount of coating retained, and the log R value again determined.

The results obtained for samples A and B are given in Table I.

TABLE I

| Sample | Percent Load | Log R After Treatment | Percent Coating Retained |
|---|---|---|---|
| A | 2.78 | 12.8 | 79 |
| B | 3.48 | 12.6 | 71 |

Example II

In this example various trimethylsiloxy end-capped methyl 2-cyanoethyl polysiloxanes are applied to 3 x 7-inch swatches of polyethylene terephthalate taffeta fabric, application being from either acetone or tetrahydrofuran solution. The peroxide chosen and the substituted polysiloxanes are present in the solution to the extent of providing a 2 to 5 percent by weight solution. The general procedure is the same as that described for Example I. All of the samples are crosslinked using benzoyl peroxide by heating at about 170° C. for about 2 minutes except samples G and J which are heated with 2,5-dimethyl-2,5-di(tert-butylperoxy)hexyne-3 at 180° C. for 5 minutes, and sample K (1.5%, by weight, solution) which is heated without peroxide at 160° C. for 5 minutes. The results are given in Table II. In the table, the notation such as $CN/CO_2H$ 90/10 refers to polysiloxanes in which 90 percent of the silicon atoms carry a 2-cyanoethyl group and 10 percent of the silicon atoms carry a 2-carboxyethyl group. The notations "DC" and "W" refer to a dry-cleaning cycle and a wash cycle, respectively.

group is part of a polymer chain, the unspecified linkages of the alpha carbon atom are an integral part of the polymer chain such as in polyacrylic acid or copolymers of acrylic acid with vinyl-type compounds such as, for example, ethylene, styrene, vinyl chloride, vinyl acetate, and acrylate or methacrylate esters. Maleic acid may also be used to prepare polymer molecules containing the desired grouping. In all other cases, i.e., when the desired group is not part of the polymer chain, it is more appropriately represented as

wherein R' is hydrogen or a low molecular weight hydrocarbon group.

Other variations from the detailed description can be made without departing from the scope of the invention.

What is claimed is:

1. The method of coating a surface composed of a synthetic polymeric material comprising applying to said surface a composition comprising a polysiloxane having 2-cyanoethyl groups on at least 90 percent of its silicon atoms and 2-carboxyethyl groups on at least about 1 percent of its silicon atoms, and about 2 to 20 percent, based on the weight of the polysiloxane, of an organic peroxide decomposing above about 100° C., and heating the coating to a temperature above about 100° C. but below the melting point of the synthetic polymeric material to cross-link the polysiloxane.

2. The method of claim 1 in which the synthetic polymeric material is a polyester filament.

3. The method of claim 2 in which the coating is applied in an amount of about 1 to 5 percent based on the weight of the filament.

4. The method of imparting antistatic protection to a textile comprising forming an emulsion of (1) a polysiloxane containing 2-cyanoethyl and 2-carboxyethyl groups, the 2-cyanoethyl groups being present on at least 90 percent of the silicon atoms and the 2-carboxyethyl groups being present on at least 1 percent of the silicon atoms of the polysiloxane, and (2) about 2 to 20 percent, based on the weight of the polysiloxane, of an organic peroxide decomposing above about 100° C., applying the emulsion to the surface of the textile, and then heating the resulting product sufficiently to cross-link the polysiloxane.

TABLE II

| Sample | CN/CO₂H | Weight Percent Ratio of Peroxide/ Polysiloxane | Percent Load | Treatment | Log R Initial* | Log R After Treatment | Percent Coating Retained |
|---|---|---|---|---|---|---|---|
| C | 90/10 | 20 | 1.71 | 5DC | 12.6 | 14.0 | 85 |
| D | 90/10 | 20 | 1.72 | 5W | 12.6 | 13.4 | *100 |
| E | 95/5 | *10 | *1.5 | 5DC | 12.6 | 13.0 | 84 |
| F | 95/5 | 16 | 3.48 | 5W | 12.6 | 12.6 | 71 |
| G | 95/5 | 4 | *1.55 | 5DC | 12.6 | *13.0 | 88 |
| H | 98/2 | 12 | 2.31 | 5DC | 12.6 | 12.6 | 71 |
| I | 100/0 | 16 | 1.94 | 5DC | 12.6 | >15 | 21 |
| J | 100/0 | 20 | 4.23 | 5DC | 12.6 | *14.5 | 42 |
| K | 95/5 | 0.0 | 1.01 | 1DC | | >15 | 28 |

*Estimated value.

While the invention has been described with reference to certain preferred embodiments, it may also be applied to other polymeric materials to modify their properties. Shaped articles or coatings of polymers containing the

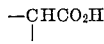

group may be cross-linked by heating with a suitable organic peroxide. The

group may be part of a polymer chain, attached directly to the main polymer chain or attached to the polymer chain through a suitable linkage. When the

5. The method of claim 4 in which the textile is a fabric composed of polyester filaments.

6. The method of claim 5 in which the organic peroxide is benzoyl peroxide.

References Cited

UNITED STATES PATENTS

| | | | |
|---|---|---|---|
| 2,911,426 | 11/1959 | Jex et al. | 117—161 X |
| 3,140,198 | 7/1964 | Dawson et al. | 117—139.5 X |
| 3,185,663 | 5/1965 | Prober | 252—78 X |
| 3,291,634 | 12/1966 | Wada et al. | 117—161 X |

WILLIAM D. MARTIN, Primary Examiner.

J. E. MILLER, Jr., Assistant Examiner.